United States Patent Office 3,482,996
Patented Dec. 9, 1969

3,482,996
PROCESS FOR PREPARING DRY AND
SEMI-DRY SAUSAGE
George Christianson, Wayzata, and David A. Carroll and
Simpey Kuramoto, Minneapolis, Minn., assignors to
General Mills, Inc., a corporation of Delaware
No Drawing. Filed Feb. 17, 1966, Ser. No. 528,056
Int. Cl. A23j 1/20, 1/14; A22c 11/00
U.S. Cl. 99—109                                7 Claims

ABSTRACT OF THE DISCLOSURE

Semi-dry and dry sausages are prepared from natural meat containing compositions by including dehydrated, spun edible protein fibers or dehydrated fibrous products derived from spun edible protein fibers in said compositions in an amount sufficient to eliminate or substantially reduce the drying time of the sausages.

---

The present invention relates to a novel sausage composition and to the process of preparing such composition. More particularly it relates to the preparation of certain sausages from natural meats and dehydrated, spun edible protein fibers or dehydrated fibrous products derived from spun edible protein fibers.

Production of so-called dry and semi-dry sausages involves the use of long storage periods in drying rooms to slowly remove moisture from the sausages. This slow drying operation is costly since expensive lean meat is needed, large drying rooms with accurate temperatures and humidity controls are needed, a large capital is invested in inventories of drying sausages and some of the meat deteriorates or is even spoiled during the long holding period. It would be highly desirable to provide a method for the preparation of semi-dry and dry sausages wherein this long drying period could be eliminated or substantially reduced.

Therefore, it is an object of our invention to provide a novel method for the preparation of sausage. A further object of our invention is to provide novel sausage compositions. Another object of the invention is to provide a method for preparing sausages using dehydrated, spun edible protein fibers or dehydrated fibrous products derived from spun edible protein fibers in combination with natural meat cuts. These and other objects will become apparent from the following detailed discussion.

We have now discovered that the drying time can be eliminated or substantially reduced in the preparation of dry or semi-dry sausages if the sausage composition includes a proportion of dehydrated, spun edible protein fibers or dehydrated fibrous products derived from spun edible protein fibers. In addition to the reduction in production costs which our process provides due to the elimination or reduction in storage facilities, inventories and the like, larger amounts of less expensive, fatter cuts of natural meats can be used in our novel sausages.

The spun edible protein fibers can be produced by any of the methods known in the art. Thus, a wide variety of protein materials which are edible can be used in preparing a dispersion or spinning dope which is then transformed into edible fibers or filaments. Representative of such materials are soybean, safflower, corn, peanut and pea proteins, preferably in isolate form, as well as various animal proteins such as casein. The edible protein is dispersed in an alkaline medium in varying amounts, such as from about 10–35% by weight. A suitable alkaline medium is water containing an alkali metal hydroxide, i.e., about 5 to 10% by weight NaOH. The pH of the spinning solution can vary within relatively wide limits but is generally in the range of 9 to 13.5. The temperature of such dispersions is preferably within the range of about 20–45° C. The viscosity of the spinning solution varies widely depending upon whether the solution is subjected to a shearing action or is examined while in a static state. For example, the viscosity of such dispersions may be within the range of about 4000–7000 centipoises during the spinning operation but when the same dispersions are subjected to a very nearly static viscosity examination, such as the Stokes falling sphere experiment, they will exhibit viscosities of a much higher magnitude—i.e. 200,000–300,000 centipoises. Obviously, the viscosity, pH, temperature and concentrations of alkali metal hydroxide and protein will vary somewhat with the particular protein being dispersed. Also, the dispersion may amount to a colloidal solution and it is understood that the use of either the term dispersion or the term colloidal solution is inclusive of the other.

After formation of the dispersion or spinning dope, it is forced through an extrusion device having small holes; such as a spinneret used in the production of rayon, into a coagulating bath which is generally an acid-salt solution. The streamlets coming through the spinneret are thus precipitated in the form of filaments. The filaments issuing from the spinneret, which is actually a small die having from perhaps 1,000 to 16,000 (and preferably 3,000 to 15,000) holes each on the order of 0.002–0.006 (preferably 0.003–0.004) inch in diameter will be of a diameter of about 0.002–0.006 (preferably 0.003–0.004) inch. It is also possible to have a series of spinnerets producing filaments from the protein dispersion. Such spinnerets may have the same or different number of holes making it possible to directly produce tows of filaments having the same or different diameters.

The coagulating bath is preferably an aqueous solution of salt and an acid. The salt (i.e., NaCl, for example) can be used in widely varying concentrations such as from about 0.5 to 12% by weight. The acid can be any of those normally used in the coagulating bath. Representative acidic compounds are acetic acid, lactic acid, citric acid, phosphoric acid, adipic acid, hydrochloric acid and the like. The concentration of said acid in the bath is not critical and may vary between about 0.5 to 10% by weight. One or more coagulating baths may be used and the concentrations of acid and salt and the temperatures of such baths may vary (temperatures are normally in the range of about 30 to 90° C.).

A preferred method of preparing the spinning dope and forming the resulting fibers is the continuous process disclosed and claimed in R. W. Westeen et al. Patent No. 3,118,959 which disclosure is incorporated herein by reference.

The filaments or bundles thereof (tows) are preferably and normally stretched by pulling them from the coagulating bath over a take-away reel(s). Preferably, stretching tensions of 50–400% are applied to the filaments or fibers. It is understood, however, that higher or lower tensions can be used and also that the stretching can be performed on a series of reels each with an increasing rate of speed or an increased stretching tension. It is further understood that the stretching of the filaments or fibers can take place in the coagulating bath, after emergence thereof from the said bath, or partly in the bath and partly after emergence from the bath.

The pH of the filaments or bundles leaving the coagulating bath is generally in the range of about 1.0–4.0 which is undesirable since fibrous products prepared therefrom have a sour taste and are normally too dry and tough. Thus, the pH of said filaments is normally raised by water washing or by passing the same through a neutralizing bath which can be a salt solution containing an alkali metal hydroxide or bicarbonate, for example. The water washing or neutralization are preferably carried out until the pH of the fibers is in the range of 5.5 to 6.4. However, the pH may generally be in the range of about 4.0 to about 7.0, if desired. It is understood that the terms "neutralizing" and "neutralization" include any method of raising the pH to the desired degree.

After the neutralization step, the filaments in one preferred embodiment of our invention are freed from excess liquid and impregnated with a serum comprising a binder which consists of, or contains a substantial proportion of, a heat coagulable protein such as albumen. A continuous tow of the spun edible protein fibers can be impregnated with the serum. However, the tow of fibers can be cut into various size lengths, such as 1 to 3 inches, prior to such admixture with the binder containing serum. Also, the impregnating serum can contain additional materials such as flavoring agents, colorants and the like. Such materials include various spices and salts, imitation meat flavors, dyes and emulsifiers. The serum can also contain vegetable oils and animal fats and oils. Representative of the latter materials are soybean oil, cottonseed oil, corn oil, coconut oil, palm kernal oil, olive oil, peanut oil, sesame seed oil, safflower oil, tallow, lard, butter, cod-liver oil and the like. Such oils or fats may be partially or fully hydrogenated.

The heat coagulable binder is used in an amount sufficient to bind the edible spun protein fibers into pieces which do not readily disintegrate after being heat-set. Preferably the ratio (dry basis) of binder to fiber will be in the range of about 2:1 to 1:4. A particularly preferred ratio is about 1:1 by weight. As indicated above the binder may consist of albumen. The same is preferably derived from fresh eggs or dried egg white. A preferred binder consists essentially of a mixture of albumen, gluten and particulate defatted oilseed material. The gluten used as part of such a combination binder is preferably wheat gluten. The preferred wheat gluten may be freshly prepared or may be in dehydrated form. Such dried gluten is preferably reconstituted with water to about 50 to 75% $H_2O$ by weight.

The particulate defatted oilseed material used in the preferred combination binder is a flour or meal derived from oilseeds such as soybeans, peanuts, castor beans, safflower seeds, and the like. Said particulate material is preferably prepared from soybeans. The beans are first broken down to form flakes (hulls and the like are removed). The oil is then extracted from the flakes by any suitable means such as with a petroleum solvent and/or an alcohol. A particularly suitable petroleum solvent is hexane. Representative alcohols are ethanol and isopropanol. Aqueous solutions of said alcohols may also be used with the azeotropic solutions being preferred. The solvents are mixed with the oilseed flakes and agitated for a sufficient length of time to remove substantially all of the oil therefrom. It is also possible to first extract the flakes with hexane, for example, followed by extraction thereof with alcohol. The alcohols have a tendency to remove most or all of the bitter ingredients of the oilseed flakes. After extraction, the petroleum solvent and/or alcohol is removed by vapor desolventizing. Thus, hexane-wet flakes, for example, can be subjected to a continuous stream of superheated hexane vapors in a closed system. It is understood that other desolventizing means can be used such as vacuum, warm air drying and the like. In fact, any of the known methods of extracting oils from the oilseed flakes can be used. The substantially solvent- and oil-free flakes are then preferably toasted by heating at elevated temperatures of about 100–150° C. for a few minutes to an hour or more. Such toasting decreases the solubility of the protein particulate material. Additionally, the flakes are preferably reduced in size to a fairly uniform flour having particles which will pass a 100 to 300 mesh screen.

The amounts of albumen, gluten and particulate defatted oilseed material in the preferred combination binder can vary considerably, it being only necessary that such combination binder provides a product having the spun edible protein fibers bound together sufficiently so that the product does not readily disintegrate after being heat set. Preferably, the ratio (dry basis) of gluten to albumen will be about 0.25:1 to 5.0:1. The ratio (dry basis) of particulate defatted oilseed material to albumen is also preferably about 0.25:1 to 5.0:1. Particularly preferred ratios of gluten and defatted oilseed material to albumen are 0.5:1 to 1.5:1. It is also understood that when dehydrated albumen and/or gluten are used enough water will be added thereto or during the impregnation step to rehydrate same.

The spun protein fibers preferably contain about 50 to 80% water by weight prior to the impregnation thereof. It is especially preferred that the fibers contain about 60 to 70% by weight water prior to the said impregnation. As indicated above the fibers can be impregnated with the serum in one step, such serum containing the binder and all of the other desired ingredients. However, less preferably the binder and other ingredients can be applied in more than one step and separately if desired.

The impregnated fibers are then at least partially set-up by heating such as by baking, boiling, broiling and the like. It is only necessary that the heating temperature and time is sufficient to set-up the binder. Temperatures of about 160 to 350° F. are preferred. One preferred method of not only heat setting the impregnated fibers, but also carrying out the impregnating operation, is that disclosed and claimed in John A. Page and Robert C. Dechaine application Ser. No. 380,890, filed July 7, 1964, which disclosure is incorporated herein by reference. In one preferred mode, this process involves the cutting or chopping of the unimpregnated fibers into segments, continuously impregnating the resulting randomly aligned fibers with the serum containing the binder and then moving the fibers with the serum along a confined passage to induce alignment of the individual fibers to substantially simulate the fiber alignment of natural meat, the fibers and serum preferably being heated during movement along the confined passage to at least partially set-up the impregnated product.

The impregnated fibers after being heat-set generally have a moisture content of about 55% by weight. They are then dehydrated to a moisture content of less than about 7%, and even more preferably, to a moisture content in the range of about 1.5 to 2.5% by weight. The dehydration can be effected by conventional means such as by tray or forced air drying at temperatures of about 100 to 200° F. Preferably, the set-up, impregnated fibers are ground to yield relatively small pieces or particles. Such pieces are normally irregular in shape as is the case with ground, chopped or cubed natural meats. The pieces preferably have a rough diameter or outside dimension of less than about one inch. Especially preferred pieces have a rough diameter of ⅛ to ⅜ inches. Of course, the pieces or particles may be mixed and thus any particular sample may contain different sized pieces or particles in varying amounts. The grinding is preferably completed prior to the drying step. Such grinding can be carried out with conventional meat grinding machines.

As another preferred embodiment, the spun edible protein fibers can be dehydrated and used directly in the preparation of sausages according to our invention. Thus, no binder or other additives need be combined with the fibers. The same are preferably cut into short lengths—i.e. 1 to 3 inches—and then dehydrated to a moisture content of less than about 7% by weight and preferably to a moisture content in the range of about 1.5 to 2.5% by weight.

In addition to the above-described dehydrated, spun edible protein fibers or dehydrated fibrous products derived from spun edible protein fibers, the sausage compositions also contain natural meat cuts. Any of such cuts conventionally used in the preparation of sausage can be used in our process. Various cuts of beef and pork are preferred and the same may be used in various combinations. And as indicated above, our process allows for the production of sausages containing a large proportion of unattractive, fatter cuts of meat such a beef navels, deckles, plates and pork trim and jowls. Additionally, spices are added to flavor the compositions to the desired degree. Conventional curing agents such as sodium nitrite, sodium nitrate and salt can also be included. Starter cultures of selected lactic acid producing organisms are preferably included to aid in the development of a proper and desired flavor.

The natural meat cuts, dehydrated, spun edible protein fibers or dehydrated fibrous products derived from spun edible protein fibers, curing salts and seasoning are mixed and then ground to the desired texture. Of course, the natural meat cuts can be at least partially ground prior to the admixture thereof with the remaining ingredients. In addition, the dehydrated fibers or fibrous products are preferably used in the form of chopped fibers or small particles or granules, respectively. When fibrous product granules are used and the natural meat cuts are first ground, only a simple admixing operation is required. However, it is preferred to grind all of the ingredients since this tends to yield a more uniformly admixed composition. The resulting product can then be pan cured for a few hours to several days—i.e. 12 to 48 hours—at a temperature of around 38–40° F. and higher—i.e. up to about 55° F. However, it is preferably stuffed into casings and held in a room maintained at a temperature of 70–75° F. and at a relative humidity of 75–80% for a few hours to a few days. The sausages are then processed in the smoke house until the desired color is developed. The degree of smoking and temperature are dictated somewhat by the type and flavor desired in the final product.

The amount of the dehydrated, spun edible protein fibers or dehydrated fibrous product employed depends on the desired moisture content of the finally prepared sausage. It also depends upon whether or not some drying of the sausages is to be undertaken. For example, so-called conventionally prepared "new sausage" is generally held in the drying room (45–55° F., relative humidity of 70–72%) for 10–25 days or until approximately 20% of the moisture has been removed (initial moisture content of about 50%). So-called "medium dry sausage" and "fully dried sausage" are held in the drying room for 30–60 days and 60–90 days, respectively, or until the moisture loss is 30% and 35–40%, respectively. By including in the raw materials for such sausages an amount of the dehydrated fibers or dehydrated fibrous product to take up the above-described moisture losses, no drying time is required. Thus, the amount of the dehydrated fibers or dehydrated fibrous product employed in our process is that amount sufficient to eliminate or substantially reduce the drying time of the sausages.

The following specific examples are furnished for the purpose of illustration only and are not to be construed as placing any limitations on the scope of the present invention.

EXAMPLE I

A tow of soy protein fibers (prepared from isolated soy protein by the procedure of the example of the aforementioned Westeen et al. patent) was cut so that the fibers had lengths of about one to two inches. The fibers had a pH of about 4.0–4.5 and the tow of fibers had a moisture content of about 65–70% by weight. The fibers were continuously impregnated by mixing the same with an impregnating serum. The impregnating serum consisted of the following ingredients:

| | Amount (parts by weight) |
|---|---|
| Oil (a lightly hydrogenated mixture of cottonseed and soybean oils) | 20.01 |
| Water | 51.41 |
| Binder: | |
| Dried egg albumen | 12.68 |
| Dried wheat gluten | 12.17 |
| Toasted, defatted soybean flour | 9.89 |
| Mono-sodium glutamate | 0.74 |
| Onion powder | 7.10 |
| Brown sugar | 5.07 |
| Salt (NaCl) | 1.32 |
| Red dye (1% aqueous solution) | 0.30 |
| Hydrolyzed vegetable protein flavor | 1.77 |
| Caramel and cocoa coloring | 0.69 |

The weight ratio of serum to fiber on a dry basis was 2.5:1. The impregnation and mixing were carried out according to the procedure disclosed in the aforementioned Page et al. application. Thus the fibers were impregnated and then continuously moved along a confined passage to induce alignment of the individual fibers. The impregnated fibers were heated to a temperature of about 175° F. during the movement along the confined passage. At the same time they were compressed somewhat. They were then forced through a 3/16 inch die and cut into particles having approximately sizes of 3/16–3/8 inch (rough diameter). The particles or pieces were then dried to a moisture content of about 2.5% in a forced air drier at a temperature of 150° F. The dehydrated granules had a particle size of approximately 3/16 inch (rough diameter) although there were some larger and smaller particles.

EXAMPLE II

A base sausage composition was prepared from 55 pounds boneless cow (17% fat), 20 pounds pork heart (7% fat), 12 pounds pork trim (55% fat), 7.8 pounds pork jowls (70% fat), 3.8 pounds salt, 1.4 pounds spices, 0.5 ounce sodium nitrate and 1.0 ounce Pediococcus Cerevisiae (lactic acid starter culture). This base composition was ground through a 3/8 inch plate. An analysis of the composition showed that it contained about 56% by weight water. To 100 parts by weight of said composition were added 10 parts by weight of the dehydrated fibrous product granules of Example I. This admixture was ground through a 1/8 inch plate and then the same was stuffed in casings (Visking—2–2½ inches in diameter by 6 inches in length). Analysis showed that said composition had a moisture content of about 51% by weight. The sausages were held at room temperature for six hours and then smoked (10 hours at 90° F., 1 hour at 120° F., 1½ hours at 135–138° F. and 3 hours at 160° F.). The resulting sausages had good color and were fairly firm even without being dried. Of course, if desired, the said sausages could be further dried.

EXAMPLE III

Example II was repeated except that 20 parts by weight of the dehydrated fibrous product granules of Example I were employed. The sausage composition, prior to being cured and smoked, analyzed about 46% by weight $H_2O$. The cured and smoked sausage had a firm texture.

EXAMPLE IV

Example II was repeated except that 30 parts by weight of the dehydrated fibrous product granules of Example I were employed. The sausage composition, prior to being cured and smoked, analyzed 41% by weight water. The resulting cured and smoked sausages were very hard. As in Examples II and III, they had good color.

EXAMPLE V

Example II is essentially repeated using 100 pounds fat beef (about 50% fat), 5 pounds salt, .1 pound sodium nitrite cure, .1 pound spices and 30 pounds of the dehydrated fibrous product granules of Example I. A sausage similar to so-called new sausage is obtained without need for further drying. In contrast, if only natural meat is used, some 80 pounds of lean beef (15–20% fat) would be needed in place of the 30 pounds of dehydrated fibrous product granules and the resulting sausages would have to be dried for a minimum of ten days to achieve the same textural qualities. Good results are similarly obtained using dehydrated, spun edible protein fibers cut into lengths of 1–3 inches in place of the dehydrated, fibrous set-up products.

It is to be understood that the invention is not to be limited to the exact details of operation or the compositions and methods shown and described, as obvious modifications will be apparent to those skilled in the art and the invention is to be limited only by the scope of the appended claims.

The embodiments of the invention in which an exclusive property or privilege is claimed are defined as follows:

1. In the process of preparing semidry and dry sausages from a natural meat containing composition wherein the natural meat containing composition is cured, smoked and dried, the improvement comprising substantially reducing the drying time needed for obtaining the desired texture by including dehydrated, spun edible protein fibers or dehydrated fibrous products derived from spun edible protein fibers in said composition, such fibers or products being used in an amount sufficient to eliminate or substantially reduce the drying time of the sausages.

2. The process of claim 1 wherein the dehydrated fibrous product is prepared by adding a serum containing a heat coagulable protein binder to spun edible protein fibers containing about 50 to 80% by weight water, applying heat to at least partially set-up the impregnated fibers and dehydrating the said set-up, impregnated fibers to a moisture content of ess than about 7% by weight.

3. The process of claim 2 wherein the set-up, impregnated fibers are ground prior to being dehydrated.

4. The process of claim 1 wherein the dehydrated, spun edible protein fibers or dehydrated fibrous product derived from spun edible protein fibers are used in an amount of about 2.5 to 50% by weight based on the total weight of the natural meat containing composition.

5. The process of claim 1 wherein the natural meat containing composition also includes spices and curing agents.

6. The process of claim 5 wherein the curing agents are sodium chloride and sodium nitrite.

7. The process of claim 1 wherein the natural meat containing composition also includes a lactic acid starter culture.

References Cited

UNITED STATES PATENTS

| | | | |
|---|---|---|---|
| 2,682,466 | 6/1954 | Boyer | 99—14 |
| 3,093,483 | 6/1963 | Ishler et al. | 99—14 XR |
| 3,197,310 | 7/1965 | Kjelson | 99—14 XR |
| 3,210,195 | 10/1965 | Kjelson et al. | 99—14 |
| 3,383,223 | 5/1968 | Rose | 99—109 XR |

RAYMOND N. JONES, Primary Examiner

JAMES R. HOFFMAN, Assistant Examiner

U.S. Cl. X.R.

99—14, 208